United States Patent
Froissart et al.

(10) Patent No.: US 8,869,563 B2
(45) Date of Patent: Oct. 28, 2014

(54) DEVICE AND METHOD FOR MARKING THE INSIDE OF A HOLLOW GLASS ITEM

(75) Inventors: Pascal Froissart, Neuville Coppegueule (FR); Sebastien Baliteau, Bouttencourt (FR)

(73) Assignee: Pochet du Courval, Paris (FR)

(*) Notice: Subject to any disclaimer, the term of this patent is extended or adjusted under 35 U.S.C. 154(b) by 111 days.

(21) Appl. No.: 13/489,414

(22) Filed: Jun. 5, 2012

(65) Prior Publication Data

US 2012/0305432 A1  Dec. 6, 2012

(30) Foreign Application Priority Data

Jun. 6, 2011  (FR) ...................................... 11 54890

(51) Int. Cl.
*C03B 23/00* (2006.01)
*C03B 23/26* (2006.01)
*C03C 19/00* (2006.01)

(52) U.S. Cl.
CPC ......... *C03B 23/0093* (2013.01); *C03B 23/0013* (2013.01); *C03C 19/00* (2013.01)
USPC .................. 65/275; 65/102; 65/286

(58) Field of Classification Search
CPC   C03B 23/0013; C03B 23/0093; C03B 23/26; C03B 11/05; C03B 11/082; C03B 9/193; C03B 9/1932; C03B 9/1934; C03B 9/1936; C03B 9/1938; B28B 11/005; B28B 11/0854; B28B 11/0863; B28B 5/04; B28B 5/06; B28B 5/08; B44B 5/0052
USPC ................. 264/296, 320, 523, 531, 533, 534; 65/68
See application file for complete search history.

(56) References Cited

U.S. PATENT DOCUMENTS

| | | | | |
|---|---|---|---|---|
| 1,407,550 | A | * 2/1922 | Lapp | ............................. 264/319 |
| 6,134,920 | A | * 10/2000 | Hjertman et al. | ............... 65/108 |
| 2003/0026924 | A1 | 2/2003 | Fait et al. | |

FOREIGN PATENT DOCUMENTS

| | | |
|---|---|---|
| EP | 1 656 859 A2 | 5/2006 |
| FR | 2966453 A1 | 10/2010 |
| JP | 2003095671 A | 4/2003 |

OTHER PUBLICATIONS

English Translation of JP2003095671 performed by FLS, Inc. Dec. 2013.*

* cited by examiner

*Primary Examiner* — Matthew Daniels
*Assistant Examiner* — Lisa Herring
(74) *Attorney, Agent, or Firm* — McDermott Will & Emery LLP

(57) ABSTRACT

The invention relates to a device for marking the inside of a hollow glass item having at least one plunger comprising at least one raised and/or hollow pattern and a support assembly for said at least one plunger that can be moved between a first position in which the plunger is outside the item, and a second position in which the plunger is inside the item, and having radial movement means for moving said at least one plunger in a passive position spaced away from the inner surface of the side wall of the item and an active position pressed against said inner surface to imprint said at least one raised and/or hollow pattern.

7 Claims, 3 Drawing Sheets

DEVICE AND METHOD FOR MARKING THE INSIDE OF A HOLLOW GLASS ITEM

CROSS REFERENCE TO RELATED APPLICATIONS

Figure 1:
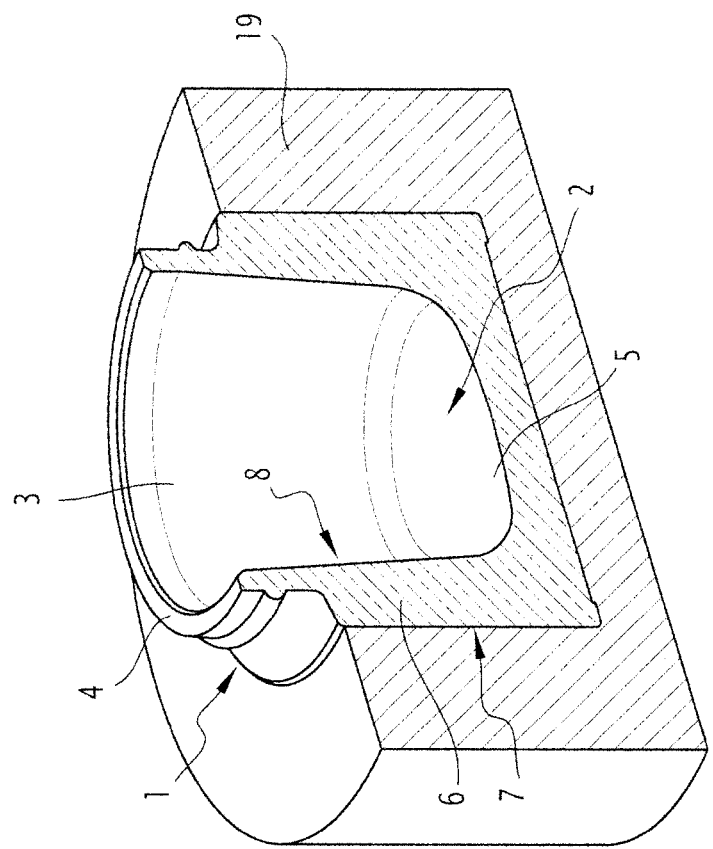

The present application claims priority under 35 U.S.C. §119 to French Patent Application No. 1154890, filed on Jun. 6, 2011, which is incorporated herein by reference.

The present invention relates to a device and method for marking the inside of a hollow glass item.

The invention also relates to hollow glass items obtained with such a marking device.

The hollow glass items, for example such as bottles or jars, are obtained by depositing at least one drop of molten glass, also called a gob, in a cavity of a parison mold. A parison is preformed in that parison mold using a plunger or by blowing a gas into the cavity of said mold.

Next, the parison thus formed is stripped and transferred, for example by a manipulator claw, into a finishing mold to definitively form the glass item by blowing a gas.

In order to customize this type of glass item, it is known to make one or more raised and/or hollow patterns on the outer surface thereof. To that end, the cavity of the finishing mold comprises one or more raised and/or hollow patterns which, during the step for definitively forming the item in the finishing mold, become embedded in the outer surface of that glass item due to the malleability of the glass.

However, certain users of glass items, in particular in the perfume or cosmetic fields, seek to personalize the glass items they use, by producing raised and/or hollow decorations on the inside, recalling or suggesting the brand and/or the product contained in the items. The inside decoration(s) may be independent of the shape of the item and these patterns or decorations can for example be particular optical effects.

The aim of the invention is to propose a marking device and method making it possible to perform this type of operation inside glass items.

The invention therefore relates to a device for marking the inside of a hollow glass item defining a container having an opening, a bottom opposite said opening, and at least one side wall delimited by an outer surface and an inner surface, characterized in that it has at least one plunger comprising at least one raised and/or hollow pattern and a support assembly for said at least one plunger that can be moved between a first position in which the plunger is outside the item, and a second position in which the plunger is inside the item, and having radial movement means, in the second position of the support assembly, for moving said at least one plunger between a passive position spaced away from the inner surface of the side wall and an active position pressed against said inner surface to imprint said at least one raised and/or hollow pattern.

The device according to the invention may include one or more of the following features, considered alone or according to all technically possible combinations:
 the support assembly comprises a stationary bearing portion at the opening of the item on the one hand, and a moving portion that can be moved in the axis of the item and supporting said radial movement means of said at least one plunger on the other hand,
 said at least one plunger is formed by an L-shaped element comprising a vertical branch supporting a removable plate provided with said at least one pattern and a horizontal branch positioned in a guideway formed in the stationary portion and connected to the radial movement means,
 the moving portion of the support assembly includes a base extending parallel to the stationary portion and supporting at least one column sliding in a well formed in said stationary portion,
 the radial movement means include an inclined ramp formed in said at least one column and cooperating with a pin secured to the horizontal branch of the L-shaped element of the corresponding plunger, said ramp being inclined toward the center of the bottom of the item,
 at least one return member is inserted between the stationary and moving portions, respectively, to return said at least one plunger to the passive position, and
 the moving portion of the support assembly is connected to at least one control member controlling the movement of said moving portion formed by a hydraulic or pneumatic cylinder.

The invention also relates to a method for marking the inside of a hollow glass item using such a device, characterized in that it comprises the following steps:
 the glass item is placed in the malleable state in a mold,
 the support assembly is placed in the axis of the item,
 the support assembly is moved in the axis of the item to make the stationary portion bear at the opening of said item and to place said at least one plunger inside said item,
 the moving portion of the support assembly is moved in the axis of the item to radially move said at least one plunger and to bring it into the active position pressed against the inner surface of the side wall and imprint said at least one pattern on that inner surface,
 the moving portion of the support element is released to return said at least one plunger to the passive position, and
 the support assembly is removed.

The invention also relates to a hollow glass item defining a container comprising an opening, a bottom opposite said opening, and at least one side wall delimited by an inner surface and an outer surface, characterized in that the inner surface of said at least one side wall comprises at least one raised and/or hollow pattern made using such a marking device.

Figure 2:
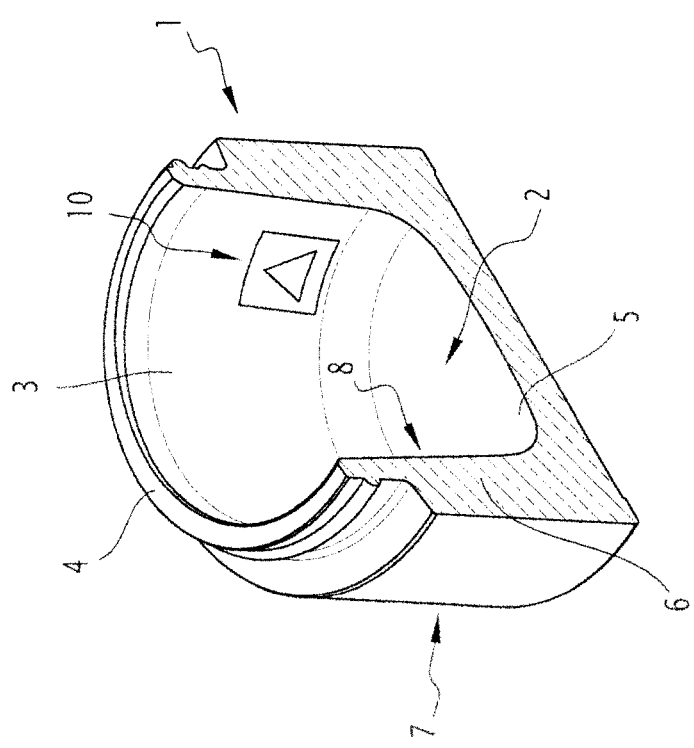
Figure 4:
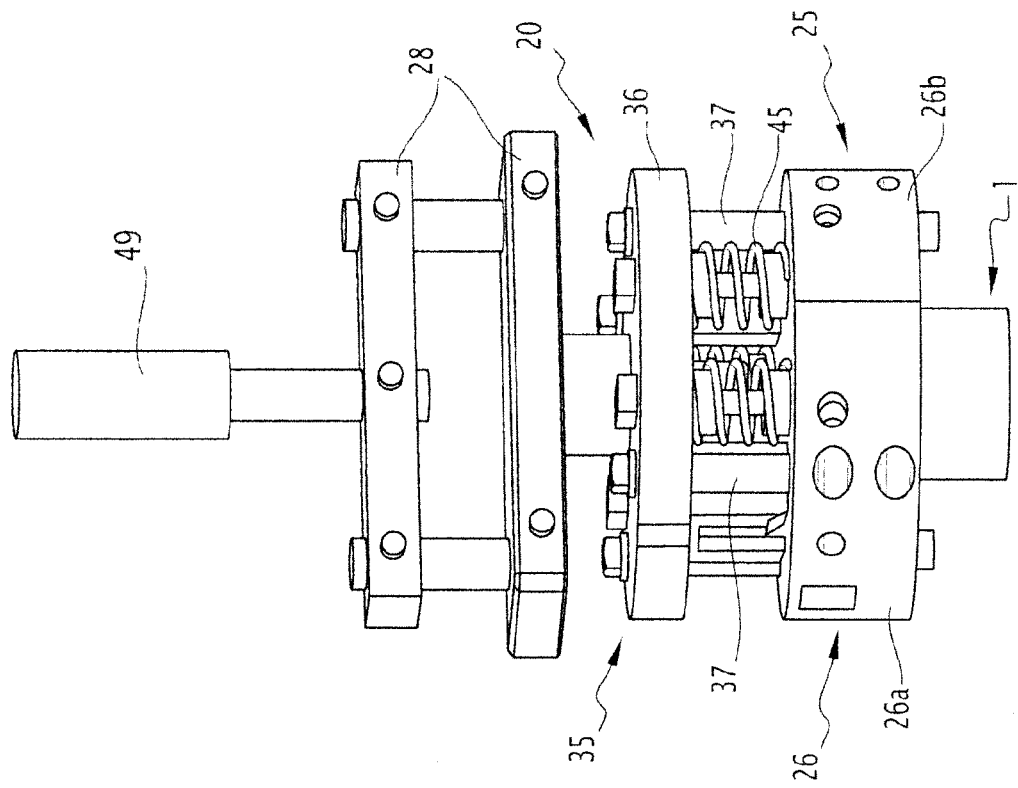
Figure 3:
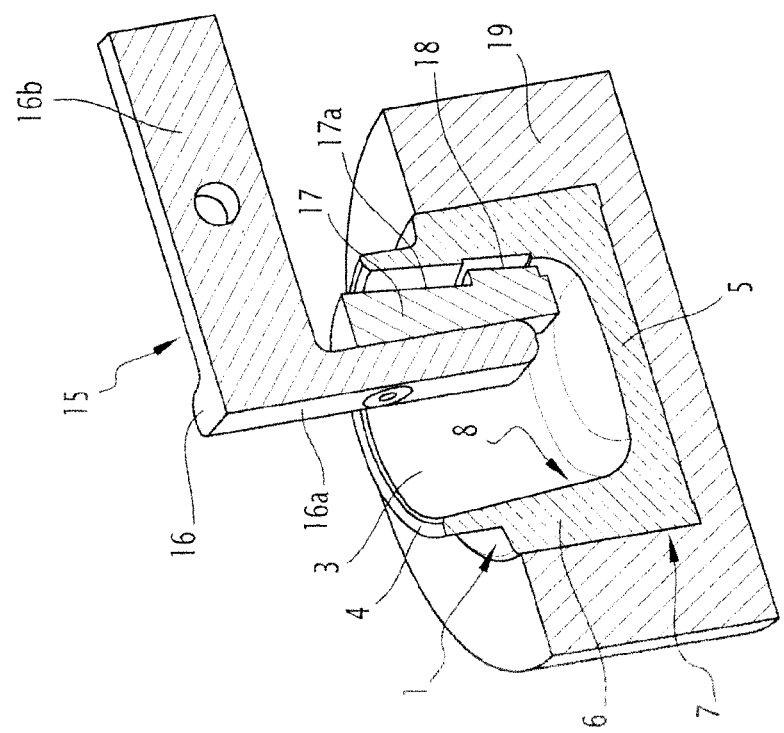
Figure 6:
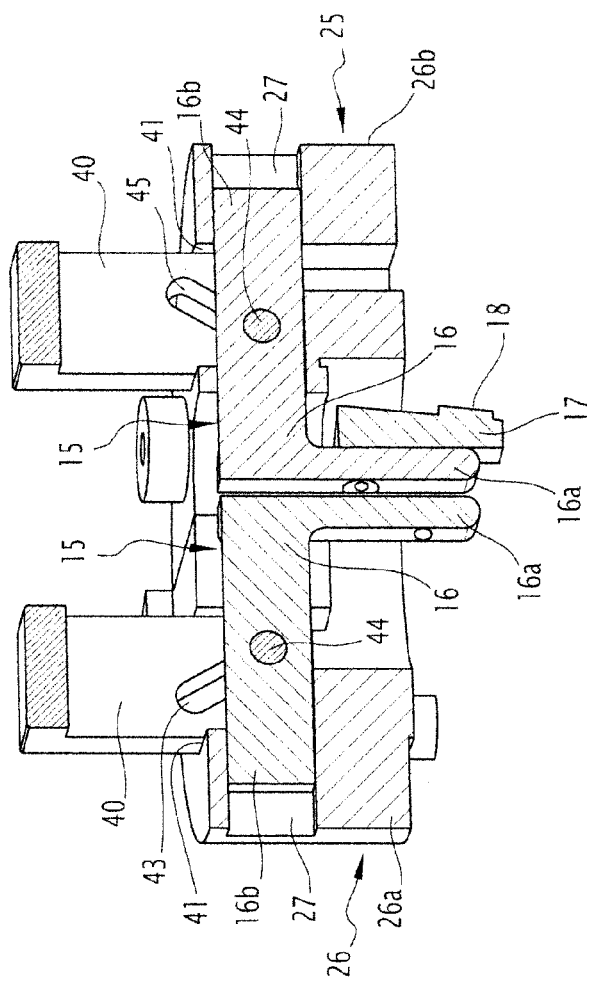
Figure 5:
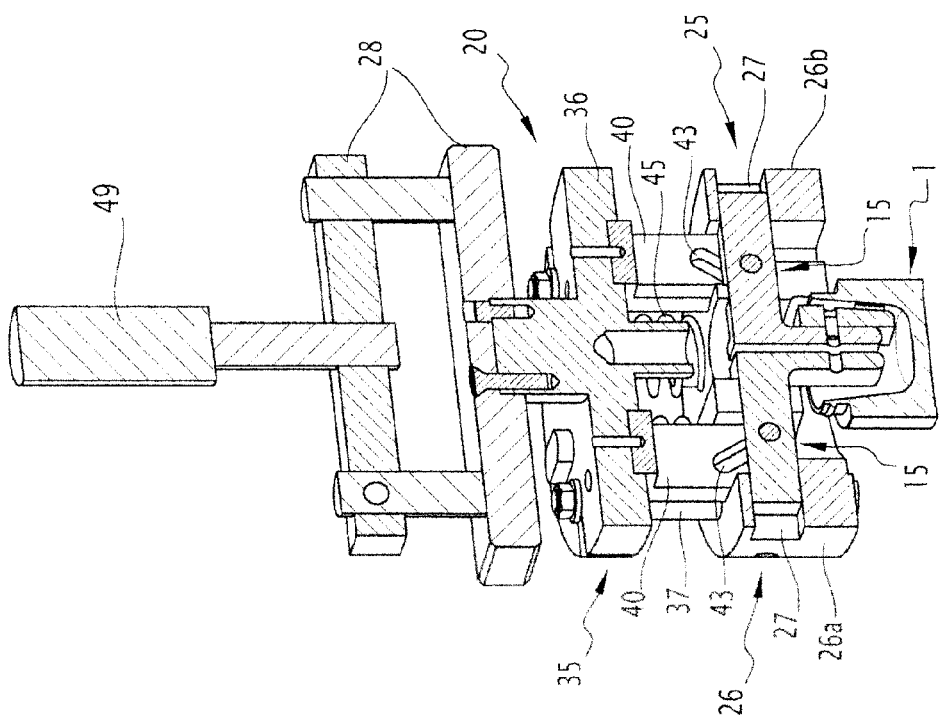

The features and advantages of the invention will appear throughout the following description, provided as an example and done in reference to the appended drawings, in which:

FIG. 1 is a diagrammatic perspective and vertical cross-sectional view of a glass item whereof the inside contains a pattern obtained using a marking device, according to the invention, FIG. 2 is a diagrammatic perspective and vertical cross-sectional view of the glass item placed in a mold, FIG. 3 is a diagrammatic perspective and vertical cross-sectional view of the glass item and the mold with a plunger of the marking device, according to the invention, FIG. 4 is a diagrammatic perspective view of the marking device, according to the invention, FIG. 5 is a diagrammatic perspective and vertical cross-sectional view of the marking device shown in FIG. 4, and FIG. 6 is a diagrammatic perspective and vertical cross-sectional view of the radial movement means for moving the plunger of the marking device, according to the invention.

FIG. 1 shows, diagrammatically and in vertical cross-section, a hollow glass item generally designated by reference 1.

The item 1 defines a container 2 having an opening 3 delimited by a neck 4 and a bottom 5 opposite said opening 3. The container 2 of the item 1 also includes at least one side wall 6 delimited by an outer surface 7 and an inner surface 8.

In the embodiment shown in the figures, the glass item 1 is generally circular, but said glass item 1 can have any other shape, for example such as a generally parallelepiped shape.

As shown in FIG. 1, the inner surface 8 of the side wall 6 comprises at least one raised and/or hollow pattern 10 made using a marking device, according to the invention.

The inner surface 8 of the side wall 6 can comprise several raised and/or hollow patterns 10 of various shapes.

To produce such a pattern 10 inside the glass item 1 on the inner surface 8 of the side wall 6, the marking device comprises, inter alia, at least one plunger designated by general reference 15 and shown in FIG. 3. This plunger 15 is formed by an L-shaped element 16 comprising two branches extending perpendicular to one another, a first branch 16a referred to as the vertical branch and a second branch 16b referred to as the horizontal branch. The vertical branch 16a of the element 16 supports a removable plate 17 provided on the outer surface 17a thereof with at least one raised and/or hollow pattern 18 corresponding to the pattern 10 to be imprinted on the inner surface 8 of the side wall 6 of the glass item 1. The plate 17 is interchangeable so as to mount the plate corresponding to the pattern to be printed on the element 16.

As shown in FIGS. 4 and 5, said at least one plunger 15 is supported by a support assembly designated by reference 20.

The support assembly 20 includes a stationary bearing portion 25 bearing at the opening 3 of the item 1, on the one hand, and a moving portion 35 movable in the axis of the item 1 and supporting radial movement means of said at least one plunger 15 on the other hand.

In the embodiment illustrated in FIGS. 4 to 6, the marking device is equipped with two plungers 15, only one of the plungers 15 being provided with the removable plate 17 supporting said at least one raised and/or hollow pattern 18.

According to one alternative, the other plunger 15 can also be equipped with a removable plate 17 also comprising a pattern 18.

The stationary portion 25 of the support assembly 20 is formed by at least one ring 26 and, preferably, by two juxtaposed half-rings 26a and 26b each supporting an L-shaped element 16 of a plunger 15, as will be seen later.

The half-rings 26a and 26b are connected to one another by suitable means of a known type, not shown, and are intended to bear at the neck 4 of the opening 3 of the item 1, and in particular on a mold 19 in which the glass item is placed in the malleable state, as shown in FIG. 2.

As shown more particularly in FIGS. 5 and 6, the horizontal branch 16b of each L-shaped element 16 is positioned in a guideway 27 formed in the corresponding half-ring 26a or 26b.

The moving portion 35 of the support element 20 in particular includes a base 36 extending parallel to the stationary portion 25. This moving portion 35 can be moved in the axis of the glass item 1 and the base 36 is guided during the movement thereof by rods 37 attached to the stationary portion 25 and extending parallel to the axis of the glass item 1.

In general, the support assembly 20 comprises radial movement means for moving said at least one plunger 15 between a passive position spaced away from the inner surface 8 of the side wall 6 and an active position pressed against said inner surface 8 to imprint said at least one raised and/or hollow pattern 18.

As shown more particularly in FIGS. 5 and 6, these radial movement means include, for each plunger 15, a column 40 supported by the base 36 and slidingly mounted in a well 41 formed in the stationary portion 25, and more particularly in each half-ring 26a and 26b, in each of which a column 40 slides.

The radial movement means of each plunger 15 include an inclined ramp 43 formed in each column 40 and cooperating with a pin 44 secured to the horizontal branch 16b of the L-shaped element 16 of the corresponding plunger 15.

As shown in particular in FIG. 6, each ramp 43 is inclined toward the center of the bottom 5 when the support assembly 20 is placed on the glass item 1, as will be seen later.

At least one return member 45, preferably several return members 45 are inserted between the stationary 25 and moving 35 portions, respectively, to return each plunger 15 to the passive position. Said at least one return member 45 is formed by one or more compression springs, for example, or by one or more hydraulic or pneumatic cylinders.

The moving portion 35 of the support assembly 20 is connected by connecting members 48 to at least one control member 49 for controlling the movement of the moving portion 35, said control member 49 being formed by a hydraulic or pneumatic cylinder or by any other suitable member.

The inner surface 8 of the side wall 6 of the glass item 1 is marked using the marking device 20 as follows.

First, the glass item 1, the glass of which is still in the malleable state, is placed in the mold 19, as shown in FIG. 2, which may consist of a finishing mold of a facility for manufacturing glass items 1.

The width of the plungers 15 is determined so that the plungers 15 penetrate the inside of the item 1 through the opening 3.

The marking device is brought, using suitable means (not shown), into the axis of the glass item 1, and said device is gradually moved into the axis of the item 1 to make the stationary portion 25 bear at the neck of the opening 3, and in particular to make it bear on the upper portion of the mold 19 to place the vertical branches 16a, at least one of which supports the removable plate 17, inside the glass item 1, as shown in FIG. 5. In that position, the half-rings 26a and 26b of the stationary portion 25 bear on the mold 19, and therefore can no longer move.

Then, the control member 49 is actuated, which results in moving, by means of the connecting members 48, the base 36 of the moving portion 35 toward the stationary portion 25 by compressing the compression springs 45. During that movement, the base 36 is guided by the rods 37.

During the movement of said base 36, the columns 40 each slide in the corresponding well 41 and move toward the bottom 5 of the item 1 parallel to the axis of that item 1.

During the movement of the columns 40, the inclined ramp 43 of each column 40 cooperating with a pin 44 moves the L-shaped element 16 of each plunger 15 toward the outside of the glass item 1, i.e. toward the inner surface 8 of the side wall 6. The pattern 18 of the removable plate 17 of the plunger 15 comes into contact with the inner surface 8, and the pressure applied allows the pattern 18 to penetrate the still-malleable glass of the item 1, without altering the general geometry of that item 1. The temperature of the glass must be high enough to allow the inner surface 8 of the side wall 6 to be deformed.

After marking, and after the control member 49 has been stopped, the base 36 of the moving portion 35 returns to its initial position by the compression springs 45 and the plungers 15 return to the passive position, in which the removable plate 17 is spaced away from the inner surface 8 of the side wall 6.

The marking device 20 is removed so as to free the glass item 1, the inner surface 8 of the side wall 6 of which comprises one or more raised and/or hollow patterns 10.

The marking by the device 20 may be done before, after, or jointly with a blowing operation intended to shape the item or maintain the inner pressure thereof.

The temperature of the patterns 18 formed on the removable plate 17 of the corresponding plunger 15 may be regulated so as to ensure a good output quality and to eliminate adhesion or deformation effects. These patterns 18 can be made from steel or cast iron. These materials can be coated with a layer of thermally sprayed metal to improve the performance thereof. The pattern(s) 10 thus formed on the inner surface 8 of the side wall 6 of the glass item 1 can then be partially or fully decorated.

The invention claimed is:

1. A device for marking the inside of a hollow glass item defining a container having an opening, a bottom opposite said opening, and at least one side wall delimited by an outer surface and an inner surface, comprising at least one plunger, comprising:
    at least one raised or hollow pattern;
    a support assembly for said at least one plunger that can be moved between a first position in which the plunger is outside the item, and a second position in which the plunger is inside the item; and
    a radial movement device, in the second position of the support assembly, moving said at least one plunger between a passive position spaced away from the inner surface of the side wall and an active position pressed against said inner surface to imprint said at least one raised or hollow pattern;
    wherein the support assembly comprises:
    a stationary bearing portion at the opening of the item on the one hand, and
    a moving portion that can be moved in an axis of the item and supporting said radial movement device of said at least one plunger on the other hand.

2. The device according to claim 1, wherein said at least one plunger comprises an L-shaped element, comprising:
    a vertical branch supporting a removable plate provided with said at least one raised or hollow pattern; and
    a horizontal branch positioned in a guideway formed in the stationary bearing portion and connected to the radial movement device.

3. The device according to claim 2, wherein the radial movement device comprises an inclined ramp formed in said at least one column and cooperating with a pin secured to the horizontal branch of the L-shaped element of the at least one plunger, wherein said ramp being inclined toward the center of the bottom of the item.

4. The device according to claim 1, wherein the moving portion of the support assembly comprises a base extending parallel to the stationary bearing portion and supporting at least one column sliding in a well formed in said bearing stationary portion.

5. The device according to claim 1, wherein at least one return member is inserted between the stationary bearing and moving portions, respectively, to return said at least one plunger to the passive position.

6. The device according to claim 1, wherein the moving portion is connected to at least one control member controlling the movement of said moving portion formed by a hydraulic or pneumatic cylinder.

7. A method for marking the inside of a hollow glass item defining a container having an opening, a bottom opposite said opening, and at least one side wall delimited by an outer surface and an inner surface using a device for marking the inside of a hollow glass item, said device comprising at least one plunger, comprising:
    at least one raised or hollow pattern;
    a support assembly for said at least one plunger that can be moved between a first position in which the plunger is outside the item, and a second position in which the plunger is inside the item; and
    a radial movement device, in the second position of the support assembly, moving said at least one plunger between a passive position spaced away from the inner surface of the side wall and an active position pressed against said inner surface to imprint said at least one raised or hollow pattern;
    wherein the support assembly comprises:
    a stationary bearing support at the opening of the item one the one hand, and
    a moving portion that can be moved in an axis of the item and supporting said radial movement device of said at least one plunger on the other hand,
    wherein the method comprises the following steps:
    placing the hollow glass item in a malleable state in a mold,
    placing the support assembly in the axis of the hollow glass item,
    moving the support assembly in the axis of the hollow glass item to make the stationary bearing portion bear at the opening of said hollow glass item and to place said at least one plunger inside said hollow glass item,
    moving the moving portion of the support assembly in the axis of the hollow glass item to radially move said at least one plunger and to bring it into the active position pressed against an inner surface of the side wall of the hollow glass item and imprint said at least one pattern on that inner surface,
    releasing the moving portion of the support assembly to return said at least one plunger to the passive position, and
    removing the support assembly.

* * * * *